United States Patent
Frost et al.

(10) Patent No.: US 10,281,907 B1
(45) Date of Patent: May 7, 2019

(54) RESIDUAL MODE FILTERS

(71) Applicant: The United States of America as Represented By the Administrator of the National Aeronautics and Space Administration, Washington, DC (US)

(72) Inventors: Susan A. Frost, Cupertino, CA (US); Mark J. Balas, Laramie, WY (US)

(73) Assignee: United Stated of America as Represented by the Administrator of the NASA, Washington, DC (US)

( * ) Notice: Subject to any disclaimer, the term of this patent is extended or adjusted under 35 U.S.C. 154(b) by 186 days.

(21) Appl. No.: 15/136,691

(22) Filed: Apr. 22, 2016

Related U.S. Application Data (63) Continuation-in-part of application No. 13/662,346, filed on Oct. 26, 2012, now abandoned.

(60) Provisional application No. 61/665,745, filed on Jun. 28, 2012.

(51) Int. Cl.
  *G05B 13/00* (2006.01)
  *G05B 19/418* (2006.01)

(52) U.S. Cl.
  CPC ............. *G05B 19/41885* (2013.01); *G05B 2219/39215* (2013.01); *G05B 2219/39233* (2013.01)

(58) Field of Classification Search
  CPC .... G05B 19/41885; G05B 2219/39233; G05B 2219/39215
  USPC .......................................................... 700/28
  See application file for complete search history.

(56) References Cited

U.S. PATENT DOCUMENTS

| | | | | |
|---|---|---|---|---|
| 5,687,075 A | * | 11/1997 | Stothers | G10K 11/178 700/28 |
| 6,088,414 A | * | 7/2000 | Dove | H03D 3/241 375/373 |
| 8,200,346 B2 | * | 6/2012 | Thiele | G05B 17/02 700/44 |
| 2003/0144805 A1 | * | 7/2003 | Shinohira | G01R 31/34 702/65 |
| 2004/0030416 A1 | * | 2/2004 | Erickson | G05B 5/01 700/28 |
| 2005/0256593 A1 | * | 11/2005 | Ogunnaike | G05B 5/01 700/44 |

(Continued)

OTHER PUBLICATIONS

Adaptive Control Using Residual Mode Filters Applied to Wind Turbines, American Institute of Aeronautics and Astronautics (Mar. 29-31, 2011).*

(Continued)

*Primary Examiner* — Miranda M Huang
*Assistant Examiner* — Olvin Lopez Alvarez
(74) *Attorney, Agent, or Firm* — Rhys W. Cheung; Robert M. Padilla; Mark P. Dvorscak (57) ABSTRACT

Methods and systems for controlling a physical system (plant) are disclosed. The plant is modeled as a linear, finite-dimensional system having a state vector, a control input vector, a plant output vector, and a disturbance vector comprising disturbances having known basis functions and unknown amplitudes. An adaptive control law is used with separate adaptive gains for an error vector associated with the plant output vector, and the disturbance vector, plus a fixed gain for a disturbance estimator. The adaptive control law is operable to adjust the control input vector so as to minimize the error vector. The plant includes modes which are not Almost Strictly Positive Real (ASPR).

4 Claims, 5 Drawing Sheets

(56) References Cited

U.S. PATENT DOCUMENTS

| | | | | |
|---|---|---|---|---|
| 2008/0068056 A1* | 3/2008 | Poulton | ................ | H03L 7/0812 327/156 |
| 2009/0041173 A1* | 2/2009 | Lin | ................ | H03D 13/003 375/374 |
| 2012/0038508 A1* | 2/2012 | Mizuochi | ................ | G01S 19/26 342/357.23 |

OTHER PUBLICATIONS

Augmented Adaptive Control of a Wind Turbine in the Presence of Structural Modes, 2010 American Control Conference (Jun. 30-Jul. 2, 2010).*

Davidson, Balas, Reisenauer, "Adaptive CSI compensation for reduced-order-model-based control of a flexible robot manipulator," Proceedings of the American Control Conference 1990 San Diego, CA, vol. 1, May 1990 pp. 334-339. (Year: 1990).*

Balas et al, "Direct Adaptive Rejection of Vortex-Induced Disturbances for a Powered Spar Platform", 2009, pp. 1-11 (Year: 2009).*

Frost et al "Modified Adaptive Control for Region 3 Operation in the presence of Wind Turbine Structural Modes", Jan. 2010, pp. 1-12. (Year: 2010).*

Balas et al "Adaptive Control of Linear Modal Systems using Residual Mode filters and a Simple Disturbance Estimator", Jul. 2011, pp. 2338-2343. (Year: 2011).*

Frost et al, "Direct adaptive control of a utility-scale wind turbine for speed regulation", 2009, pp. 59-71. for speed regulation (Year: 2009).*

Livneh et al, "Some Conditions for Strictly Positive Real and Almost Strictly Positive Real Structures" 1990, pp. 81-85. (Year: 1990).*

Rusnak et al, "SPR and ASPR Untangled", 2009, pp. 6. (Year: 2009).*

Robotics, Automation & Control, "Residual Mode Filters" Sep. 1, 2016, pp. 2. (Year: 2016).*

* cited by examiner

RESIDUAL MODE FILTERS

CROSS-REFERENCE TO RELATED APPLICATIONS

This Application is a Continuation-In-Part of U.S. patent application Ser. No. 13/662,346, filed Oct. 26, 2012, which claims priority to U.S. Provisional Application No. 61/665,745, filed Jun. 28, 2012, each of which is incorporated herein by reference in its entirety.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

One or more embodiments of the present invention relate to adaptive control systems.

BACKGROUND

Flexible structures having a large number of flexible modes can benefit from adaptive control techniques. These techniques are well suited to applications that have unknown modeling parameters and poorly known operating conditions. However, creating an accurate model of the dynamic characteristics of a structure can be extremely difficult if not impossible.

Most systems requiring closed-loop control have nonlinearities and uncertainties in their system dynamics. Computer simulation models of dynamical systems are very expensive to produce and cannot accurately represent important nonlinear system dynamics. Modern and classical control system design relies on linear plant models, leading to likely problems with unmodeled dynamics that can drive a system to instability. For many applications, it is a lengthy process to create a control system that is robust to unmodeled dynamics while achieving the desired performance. Often, it is only through encountering off-nominal situations that important nonlinear dynamics are understood. Unfortunately, this discovery may come too late, after a system is in use, leading to issues with safety, product integrity, performance, reliability, etc.

Various methods are known in the art for dealing with nonlinear control problems. For example, use of fixed gain controllers with gain scheduling is known for use with aircraft flight control systems, where gains are scheduled for different expected operating conditions around which a linear model is created. Notch filters are known for use with frequencies that can interact with the control system or excite resonant frequencies. For example, flight control systems may use notch filters to prevent commands issued from the control system to excite aircraft wing flexible modes that could lead to destructive behavior, for example, due to resonance. All physical systems experience external disturbances that have varying effects on system behavior. These disturbances can have potentially profound effects on systems, especially when the disturbances are persistent (i.e., continually recurring or slowly decaying). Disturbance rejection is known, where the disturbance must be modeled accurately so that it can be accommodated or rejected from the plant output states and so that it does not enter the feedback loop. However, it is not always possible to know and accurately model the disturbance in advance.

A physical system or "plant" can often be usefully modeled as a linear, time-invariant, finite dimensional system:

$$\begin{cases} \dot{x}_p = Ax_p + Bu_p + \Gamma u_D \\ y_p = Cx_p; x_p(0) = x_0 \end{cases} \quad (1)$$

where the plant state $x_p(t)$ is an $N_p$-dimensional vector, the control input vector $u_p(t)$ is M-dimensional, and the plant output vector $y_v(t)$ is P-dimensional. A, B, and C are constant matrices of the appropriate dimensions, and the notation (A, B, C) is commonly used to denote a plant modeled by (1). $\Gamma$ is a constant matrix related to the disturbance vector, $u_D(t)$, which is MD-dimensional and can be thought to come from a disturbance generator:

$$\begin{cases} u_D = \Theta z_D \\ \dot{z}_D = F z_D; z_D(0) = z_0 \end{cases} \quad (2)$$

where the disturbance state $z_D(t)$ is $N_D$-dimensional. (All matrices in (1) and (2) have the appropriate compatible dimensions.) Eqs. (1) and (2) have been used to describe systems having persistent disturbances having known form but unknown amplitude. The disturbance generator can also be rewritten in a form that is not a dynamical system, but is sometimes easier to use:

$$\begin{cases} u_D = \Theta z_D \\ z_D = L\phi_D \end{cases} \quad (3)$$

where $\theta D$ is a vector composed of the known basis functions for the solutions of $u_D = z_D$, i.e., $\theta_D$ consists of the basis functions which make up the known form of the disturbance, and L is a matrix of dimension $N_D$ by $\dim(\theta_D)$.

In much of the control literature, it is assumed that the plant and disturbance generator parameter matrices A, B, C, $\Gamma$, $\Theta$, F are known. This knowledge of the plant and its disturbance generator allows the separation principle of linear control theory to be invoked to arrive at a state-estimator-based linear controller that can stabilize the plant and suppress the persistent disturbances via feedback. However, in many systems, the plant is poorly known; only the form(s) of the disturbances are known but not the amplitudes, and other methods are required.

A practical and well-accepted representation of flexible structures is based on the finite element method (FEM). The FEM of the lumped model in physical coordinates q, for a linearized actively controlled flexible structure with M control inputs, and P plant outputs is given in matrix form as $$\begin{cases} M_0\ddot{q} + D_0\dot{q} + K_0 q = B_0 \iota \\ y_p = C_0 q + E_0 \dot{q} \end{cases} \quad (4)$$

This system can be put into a modal form with the transformation $$q = \Phi_0 \eta \quad (5)$$

where $$\begin{cases} I \equiv \Phi_0^T M_0 \Phi_0 \\ \Lambda_0 \equiv \Phi_0^T K_0 \Phi_0 \equiv \text{diag}[\omega_k^2] \end{cases} \quad (6)$$

(I is the identity matrix of appropriate dimension.)

Using the transformation (5), the modal form of (4) follows:

$$\begin{cases} \ddot{\eta} + \overline{D}_0 \dot{\eta} + \overline{\Lambda}_0 \eta = \overline{B}_0 u \\ y_P = \overline{C}_0 \eta + \overline{E}_0 \dot{\eta} \end{cases} \quad (7)$$

This system can be put into a modal first-order form with the states $$x_P \equiv \begin{bmatrix} \eta \\ \dot{\eta} \end{bmatrix} \quad (8)$$

Many kinds of systems have modal forms, and the results apply to control of any such system, not just flexible structures. The control of these physical systems or "plants" is straightforward if the plant satisfies the requirement of "Almost Strict Positive Realness," wherein the matrix product CB is positive definite and the system transfer function from the plant output to the plant input is minimum phase (e.g., all zeros of the numerator are in the left half-plane).

SUMMARY OF THE INVENTION

Methods and systems for controlling a physical system (plant) are disclosed. Example plants include windmills, buildings, bridges, robotic machinery (including, for example, industrial robots and surgical robots), cranes, space vehicle structures, aircraft, and ground transport vehicles. The plant is modeled as a linear, finite-dimensional system having a state vector, a control input vector, a plant output vector. The plant also includes a disturbance vector comprising disturbances having known basis functions and unknown amplitudes. An adaptive control law is used with separate adaptive gains for an error vector associated with the plant output vector and the disturbance vector, plus a fixed gain for a disturbance estimator, wherein the adaptive control law is operable to adjust the control input vector so as to minimize the error vector. The plant can include modes which are not Almost Strictly Positive Real (ASPR) in closed-loop feedback.

The adaptive control law includes a residual mode filter operable to filter out the non-ASPR modes. It can include a frequency-locked loop (FLL) operable to lock the filter output onto the frequency or frequencies of the residual modes. The disturbance generator can also include an FLL to acquire and lock onto the frequencies of a periodic disturbance. A frequency locked loop (FLL) is a circuit for electronic control that provides an undulating signal that is locked to a frequency of a reference signal. The circuit compares the frequency of an oscillator with the reference signal frequency and automatically raises or lowers the oscillator frequency incrementally until the two frequencies agree. Agreement of the two frequencies does not imply that the phases of the two signals agree, and conversely. Agreement of signal frequencies can be achieved using a negative feedback circuit to drive the oscillator frequency toward the reference signal, in a manner known to workers of ordinary skill in the electronic control art. When the oscillator frequency and reference signal are frequency matched, these two signals maintain a fixed or unvarying phase difference, which optionally can be driven toward a selected phase difference value using phase lock techniques. Phase difference can be measured at any time, with substantially zero capture time interval. Measurement of frequency difference requires use of a capture time interval of length that is often con signal cycle or more.

A phase locked loop (PLL) often uses a negative feedback circuit with a voltage-driven oscillator (VCO) or current-driven oscillator (CCO), a phase difference detector or phase difference comparator, and a loop filter (selected for the particular application), to approach or match in phase a frequency of an input signal. A PLL can generate a signal, modulate or demodulate a signal, or divide or multiply a frequency of a target signal by a whole number or by a rational fraction. Use and design of a PLL is also known to workers of ordinary skill in the electronic control art. See, for example, Floyd M. Gardner, *Phaselock Techniques*, John Wiley & Sons, Second Edition, 1979, pp. 1-135.

Depending upon the intended applications, an FLL, a PLL or a combination of the two may be required to achieve measurement or synchronization of a signal parameter. In a situation where an (almost) periodic perturbation provides a disturbance, application of an FLL to the disturbance may suffice to estimate the most important signal parameter, the associated frequency. In a situation where synchronization of a first signal to a second signal is required, application of a PLL or of a combined FLL and PLL may be more suitable. In the following discussion, reference to a "frequency locked loop" or to an "FLL" may include reference to a combination of an FLL and a PLL.

The physical system can be, for example, a wind turbine. The residual mode filter can filter out modes associated with the wind turbine drive train, blade flap, and/or periodic interactions between turbine blades and the wind turbine drive train.

DETAILED DESCRIPTION

It must be noted that as used herein and in the claims, the singular forms "a," and "the" include plural referents unless the context clearly dictates otherwise. Thus, for example, reference to "a structure" includes two or more structures, and so forth. Embodiments are described for speed control for horizontal axis wind turbines, although it is understood that the methods disclosed herein apply to control of any non-linear system with or without disturbances.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. The terms "about" and "approximately" generally refers to ±10% of a stated value.

Definitions

As used herein, the term "plant" refers to any physical system modeled as a collection of interconnected components. Plants typically include integrated mechanical systems such as windmills, buildings, bridges, robotic machinery, aircraft, and ground transport vehicles.

As used herein the term "Almost Strictly Positive Real" or "ASPR" refers to the behavior of a control system for a plant with a control system that can be described according to Eqn. (1), where CB is positive definite and the system transfer function from the plant output to the plant input is minimum phase; i.e., $$P(s) = \frac{CB}{sI - A} \text{ is minimum phase,} \quad (9)$$

where s is the (complex) argument of the Laplace transform of the transfer function, and I is the identity matrix of dim(A).

As used herein, the term "frequency locked loop" or "FLL" refers to a digital control loop in which the output frequency is locked to a reference frequency. An FLL is similar to a "phase lock loop" both computationally and functionally, but in an FLL, it is the frequency rather than the phase that is detected and locked onto.

Control systems and methods for controlling physical systems are provided. The innovation comprises a control algorithm and method for synthesis of the controller. The control algorithm adapts its gains to the plant output, making it ideally suited to plants that have unknown modeling parameters and operate in uncertain environments. Knowledge of the plant matrices A, B, C, Γ, Θ, F is not required. Applications that require tracking a reference point or following a reference model can be easily solved with the control algorithm. The approach allows for rejection of persistent disturbances to the plant. Knowledge of the amplitude of the disturbance is unnecessary, only the waveform or a superposition of waveforms need be known. Also disclosed is a synthesis method to design the controller to restore minimum phase to the plant. The synthesized controller operates such that asymptotic tracking is achieved with bounded adaptive gains.

The control algorithm described herein is able to perform model tracking or regulation to a set point with little knowledge of the plant dynamics or the operating environment. Many control problems can benefit from the adaptive control algorithm described here, which is well-suited to nonlinear applications that have unknown modeling parameters and poorly known operating conditions. Disturbance accommodation is a critical component of many systems. By using adaptive feedback control with disturbance accommodation, plant performance can be improved, robustness to parameter or unmodeled dynamic variations can be provided, and reliability can be increased. Often the form of a disturbance is known, but the amplitude is unknown. For instance, a motor operating on a structure used for accurate pointing would cause a sinusoidal disturbance of a known frequency content. The algorithm described here is able to accurately cancel these disturbances, without needing knowledge of their amplitude.

Many applications require filters to remove modal frequencies that might interact with the control system or drive the system's resonant frequencies to instability. Filters such as the low-pass filter and the notch filter are common examples used in practice. These filters have limitations that include phase shift and time delay of signals. The algorithm synthesis method described here allows for the creation of a filter that has a more accurate model of the modal systems to be removed from the feedback loop to the controller without causing phase shift or time delays.

The methods and systems disclosed herein facilitate control of the following example of nonlinear plants that are difficult and expensive to model: plants with unmodeled dynamics or unknown operating conditions or parameters that vary, plants needing filters to remove certain frequencies without affecting signal phase or adding time delay, plants needing disturbance accommodation for disturbances with known waveform but unknown amplitude, and plants needing disturbance tracking.

In embodiments of the present invention, the control objective is to cause the output $y_p$ of a plant to asymptotically track zero while accommodating disturbances of the form given by the disturbance generator. Define an error vector $e_y$ as $$e_y = y_p - O \quad (10)$$

The desired control objective is $e_y$ tends asymptotically toward zero:

$$\lim_{t \to \infty} e_y \to 0 \quad (11)$$

Consider a plant described by Eqn. (1) with the disturbance generator given by Eqn. (3). Define an adaptive control law of the form $$u = G_e e_y + G_D \phi_D \quad (12)$$

where $G_e$ and $G_D$ are matrices.

Adaptive gain laws can be written as $$\begin{cases} \dot{G}_e = -e_y e_y^T \Gamma_e \\ \dot{G}_D = -e_y \phi_D^T \Gamma_D \end{cases} \quad (13)$$

where $\Gamma_e$ and $\Gamma_D$ are positive definite constant matrices. The adaptive controller is specified by (12) with adaptive gain laws (13). Frost et al. ("Direct adaptive control of a utility-scale wind turbine for speed regulation," *Int. J. Robust Nonlinear Control*, 19, 59-71, 2009, incorporated herein by reference) proved that if a plant satisfies the ASPR condition, has bounded disturbances $\theta_D$, and can be stabilized with adaptive controller and gains given by (12) and (13) then the adaptive gains $G_e$ and $G_D$ remain bounded and asymptotic tracking occurs in accordance with (11).

Figure 1:
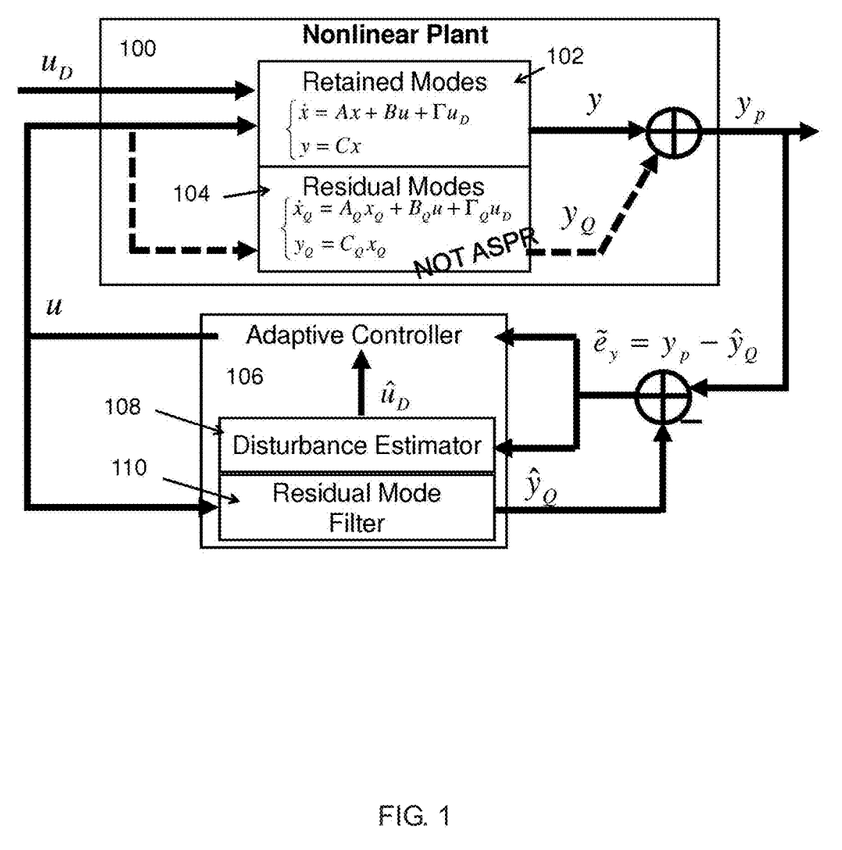
FIG. 1 shows a schematic diagram of an adaptive control system according to embodiments of the instant invention.

In some cases, the plant described by Eqn. (1) does not satisfy the requirement of Almost Strictly Positive Realness (ASPR). For example, an unmodeled modal subsystem of the full nonlinear plant can contribute to a non-ASPR condition of a plant operating with feedback control. There may be a modal subsystem comprising "Q modes" that inhibits ASPR. In embodiments of the present invention, the adaptive controller is modified with a Residual Mode Filter (RMF) to compensate for this modal subsystem. The overall process is shown schematically in FIG. 1. The plant 100 is partitioned into "retained" modes 102 that are to be controlled and stabilized and which are ASPR, and "residual" modes 104 which are not ASPR. An Adaptive Controller 106 includes a Disturbance Estimator 108 and a Residual Mode Filter 110.

Assume that (1) can be partitioned into modal form:

$$\left\{ \begin{bmatrix} \dot{x} \\ \dot{x}_Q \end{bmatrix} = \underbrace{\begin{bmatrix} A & 0 \\ 0 & A_Q \end{bmatrix}}_{A_P} \begin{bmatrix} x \\ x_Q \end{bmatrix} + \underbrace{\begin{bmatrix} B \\ B_Q \end{bmatrix}}_{B_P} u + \underbrace{\begin{bmatrix} \Gamma \\ \Gamma_Q \end{bmatrix}}_{\Gamma_P} u_D \right. \quad (14)$$

$$y_p = \underbrace{[C \ C_Q]}_{C_P} \begin{bmatrix} x \\ x_Q \end{bmatrix} = \underbrace{Cx}_{y} + \underbrace{C_Q x_Q}_{y_Q}$$

Now define $$x_P \equiv \begin{bmatrix} x \\ x_Q \end{bmatrix}; A_P \equiv \begin{bmatrix} A & 0 \\ 0 & A_Q \end{bmatrix}; B_P \equiv \begin{bmatrix} B \\ B_Q \end{bmatrix}; \Gamma_P \equiv \begin{bmatrix} \Gamma \\ \Gamma_Q \end{bmatrix}; \quad (15)$$

$$C_P \equiv [C \ C_Q],$$

A disturbance generator is defined as above in (2) and (3) to model the disturbances entering the plant. The control objective remains the same, i.e., error asymptotically approaching zero (Eqn. (11)).

Now it is possible to assume only that the subsystem (A, B, C) is ASPR rather than the full unpartitioned plant ($A_p$, $B_p$, $C_p$). The modal subsystem ($A_Q$, $B_Q$, $C_Q$) is assumed known and stable. The modal subsystem may be directly affected by the disturbance input. (Recall that ASPR means the matrix product C B is positive definite and the system transfer function is minimum phase.) Suppose the actual plant has an ASPR subsystem plus a known modal subsystem that is stable but inhibits ASPR for the full plant. Then to achieve stable control, the non-ASPR modal subsystem can be compensated or filtered away.

The Residual Mode Filter (RMF) can be defined by $$\left\{ \begin{array}{c} \dot{\hat{x}}_Q = A_Q \hat{x}_Q + B_Q u + \Gamma_Q \hat{u}_D \\ \hat{y}_Q = C_Q \hat{x}_Q \end{array} \right\} \quad (16)$$

where the disturbance estimator is given by $$\left\{ \begin{array}{c} \hat{u}_D = \Theta \hat{z}_D \\ \dot{\hat{z}}_D = F \hat{z}_D + K_D \tilde{e}_y \end{array} \right\} \quad (17)$$

The compensated tracking error is given by $$\tilde{e}_y = y_p - \hat{y}_Q \quad (18)$$

Note that the Disturbance Estimator $\hat{u}_D$ depends only on the disturbance waveform ($\Gamma$ and $\Theta$) and is independent of the plant (A, B, C).

Now define $$e_Q \equiv \hat{x}_Q - x_Q; \ e_D \equiv \hat{z}_D - z_D \quad (19)$$

The time derivative of (19) can be written using (2) and (14)-(18) as $$\left\{ \begin{array}{c} \dot{e}_Q = A_Q e_Q + \Gamma_Q \Theta e_D \\ \dot{e}_D = K_D(Cx - C_Q e_Q) + F e_D \end{array} \right\} \quad (20)$$

The compensated tracking error $\tilde{e}_y$ can be rewritten in terms of $e_Q$:

$$\tilde{e}_y = Cx - C_Q e_Q \quad (21)$$

Now define the "ideal trajectories":

$$\left\{ \begin{array}{c} \dot{x}_* = Ax_* + Bu_* + \Gamma u_D \\ \dot{x}_Q^* = A_Q x_Q^* + B_Q u_* + \Gamma_Q u_D \\ | y_* = Cx_* = 0 \\ y_Q^* = C_Q x_Q^* \end{array} \right\} \quad (22)$$

where $$\left\{ \begin{array}{c} x_* \equiv S_1 z_D \\ x_Q^* \equiv S_Q z_D \\ u_* \equiv S_2 z_D \end{array} \right\} \quad (23)$$

This is equivalent to the matching conditions $$\left\{ \begin{array}{c} \bar{S}_1 F = A_p \bar{S}_1 + B_p S_2 + \Gamma_p \Theta \\ C S_1 = 0 \end{array} \right\} \quad (24)$$

where $$\bar{S}_1 \equiv \begin{bmatrix} S_1 \\ S_Q \end{bmatrix}; (A_p, B_p, \Gamma_p) \text{ from (14) and (15)} \quad (25)$$

These matching conditions are known to be uniquely solvable when $C_p B_p = C B$ is nonsingular.

It is not necessary to know the actual solutions to the matching conditions in the adaptive control approach. Let $$\left\{ \begin{array}{c} \Delta x \equiv x - x; \Delta x_Q \equiv x_Q - x_Q^* \\ \Delta u \equiv u - u_x; \Delta y \equiv y - y_* \\ \Delta y_Q \equiv y_Q - y_Q^*; \Delta y_p \equiv y_p - y_* \end{array} \right\} \quad (26)$$

Using (14), (16), (18), (19), and (22) one obtains $$\begin{cases} \Delta y = C\Delta x \\ \Delta y_Q = C_Q \Delta x_Q \\ \Delta y_P = C\Delta x + y_Q \\ \tilde{e}_y = C\Delta x - C_Q e_Q \end{cases} \quad (27)$$

(Note that, per (22), $y_* = x_* = 0$, and $x = \Delta x$.) Now let $$e \equiv \begin{bmatrix} e_Q \\ e_D \end{bmatrix}; \overline{C}_Q \equiv [C_Q \ 0]; \overline{K}_D \equiv \begin{bmatrix} 0 \\ K_D \end{bmatrix}; \quad (28)$$

$$\overline{A}_e \equiv \begin{bmatrix} A_Q & \Gamma_Q \Theta \\ -K_D C_Q & F \end{bmatrix}$$

Then with (20) one obtains $$\begin{cases} \Delta \dot{x} = A\Delta x + B\Delta u \\ \Delta \dot{x}_Q = A_Q \Delta x_Q + B_Q \Delta u \\ \dot{e} = \overline{A}_e e + \overline{K}_D C \Delta x \\ \tilde{e}_y = C\Delta x - \overline{C}_Q e \end{cases} \quad (29)$$

Now, let $$\xi = \begin{bmatrix} \Delta x \\ \Delta x_Q \\ e \end{bmatrix} \quad (30)$$

Then (29) can be rewritten as $$\begin{cases} \dot{\xi} = \underbrace{\begin{bmatrix} A & 0 & 0 \\ 0 & A_Q & 0 \\ \overline{K}_D C & 0 & \overline{A}_e \end{bmatrix}}_{\overline{A}} \xi + \underbrace{\begin{bmatrix} B \\ B_Q \\ 0 \end{bmatrix}}_{\overline{B}} \Delta u \\ \tilde{e}_y = \underbrace{[C \ 0 \ -\overline{C}_Q]}_{\overline{C}} \xi \end{cases} \quad (31)$$

$(\overline{A}, \overline{B}, \overline{C})$ is ASPR if and only if the matrix product $C\ B$ is positive definite and $H(s)\ P(s)$ is minimum phase where $$\begin{cases} P(s) \equiv \dfrac{CB}{sI - A} \\ H(s) \equiv I - \dfrac{\overline{C}_Q \overline{K}_D}{sI - \overline{A}_e} \end{cases} \quad (32)$$

The proof of this lemma can be found in Balas and Frost ("Adaptive Control of Linear Modal Systems using Residual Mode Filters and a Simple Disturbance Estimator," *Proc. Amer. Control Conf.* 2338-43, 2011 which is incorporated herein by reference). From this lemma, there exists a $G^*_e$ such that $(\overline{A}_C, \overline{B}, \overline{C})$ is Strictly Positive Real (SPR) where $\overline{A}_C \equiv \overline{A} + \overline{B} G^*_e \overline{C}$. Then, from the well-known Kalman-Yacubovic Theorem, there exists $\overline{P}, \overline{Q}$ such that $$\begin{cases} \overline{A}_C^T \overline{P} + \overline{P} \overline{A}_C = -\overline{Q} \\ \overline{P} \overline{B} = \overline{C}^T \end{cases} \quad (33)$$

The complete adaptive control law with a residual mode filter and a disturbance estimator is given by $$\begin{cases} u \equiv G_e \tilde{e}_y + G_D \phi_D \\ \tilde{e}_y \equiv y_P - \hat{y}_Q \\ \dot{\hat{x}} = A_Q \hat{x}_Q + B_Q u + \Gamma_Q \hat{u}_D \\ \hat{y}_Q = C_Q \hat{x}_Q \\ \hat{u}_D = \Theta \hat{z}_D \\ \dot{\hat{z}}_D = F \hat{Z}_D + K_D \tilde{e}_y \end{cases} \quad (34)$$

with the adaptive gains:

$$\begin{cases} \dot{G}_e = -\tilde{e}_y \tilde{e}_y^T \gamma_e; \gamma_e > 0 \\ \dot{G}_D = -\tilde{e}_y \phi_D^T \gamma_D; \gamma_D > 0 \end{cases} \quad (35)$$

The following theorem shows that stable control is possible. In (14), assume a) $(A_Q, B_Q, C_Q)$ is stable and $(F, \Theta)$ is known b) $C\ B$ is positive definite; $H(s)\ P(s)$ is minimum phase where $$\begin{cases} P(s) \equiv \dfrac{CB}{sI - A} \\ H(s) \equiv I - \dfrac{\overline{C}_Q \overline{K}_D}{sI - \overline{A}_c} \\ \overline{C}_Q \equiv [C_Q \ 0]; \overline{K}_D \equiv \begin{bmatrix} 0 \\ K_D \end{bmatrix}; \overline{A}_e \equiv \begin{bmatrix} A_Q & \Gamma_Q \Theta \\ -K_D C_Q & F \end{bmatrix} \end{cases} \quad (36)$$

c) $\phi_D$ is bounded.

Then, the adaptive controller with RMF and disturbance estimator defined in (34) and (35) gives $$\lim_{t \to \infty} \xi \to 0 \quad (37)$$

where $$\xi \equiv \begin{bmatrix} \Delta x \\ \Delta x_Q \\ e \end{bmatrix} \quad (38)$$

with bounded adaptive gains ($G_e$, $G_D$). The proof of this theorem is given in the Appendix of Balas and Frost (op cit).

From the result of the above theorem, $$\left\{\begin{array}{c}\lim_{t\to\infty}\tilde{e}_y=\lim_{t\to\infty}\overline{C}\xi\to 0\\ \lim_{t\to\infty}\Delta y=\lim_{t\to\infty}C\Delta x\to 0\\ \lim_{t\to\infty}e\to 0\end{array}\right\} \quad (39)$$

On the other hand, considering the entire plant $y_p$, one obtains $$\Delta y_p = y_p - y_* \quad (40)$$
$$= \Delta y + y_Q$$
$$= C\Delta x + y_Q$$
$$= C\Delta x + C_Q\Delta x_Q + C_Q x_Q^*$$

$$\lim_{t\to\infty}\Delta y_p \to y_Q^*; (y_Q^* \equiv C_Q x_Q^*)$$

Note that $y^*_Q$ is not necessarily zero. However, the adaptive control algorithm described herein can be satisfactory for many plants, depending on the properties of $y^*_Q$. If it is desired that $$\lim_{t\to\infty} y_p \to 0,$$

then the constraint $y^*_Q=0$ must be added to (22), resulting in $C_Q S_Q=0$ being added to the matching conditions (24).

Figure 2:
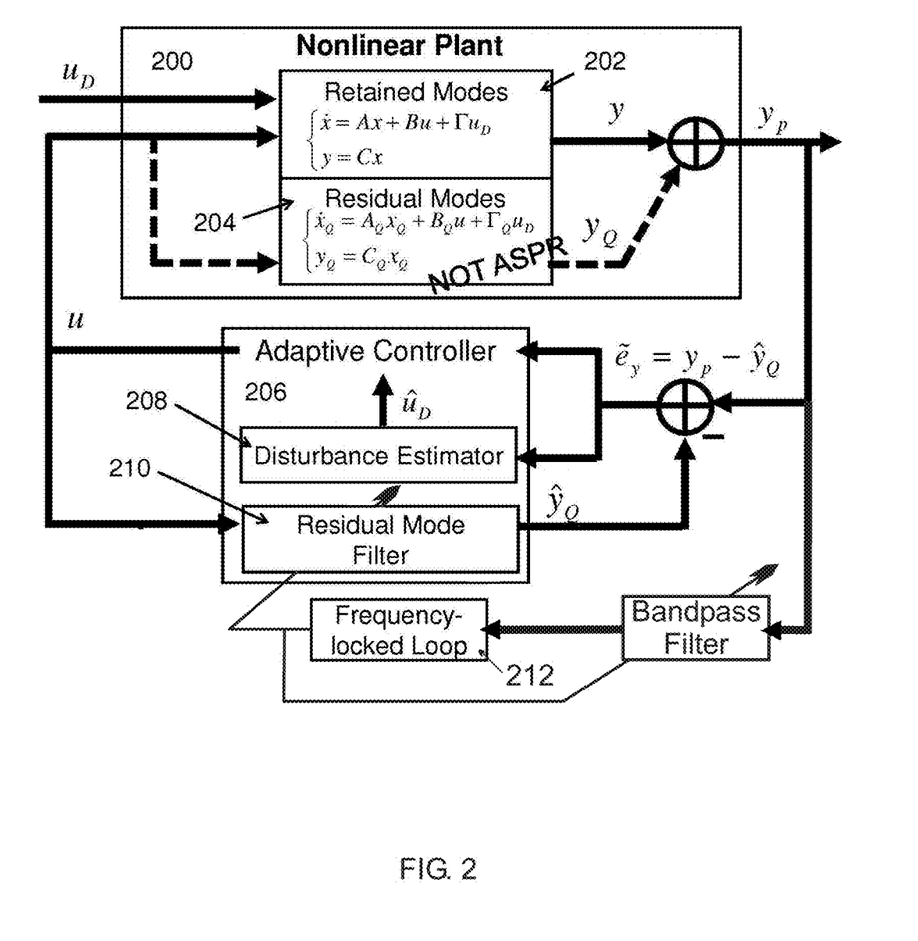
FIG. 2 shows a schematic diagram of an adaptive control system including a frequency lock loop. (Reference numbers 200-210 correspond with 100-110 of FIG. 1).

In some embodiments, an exact representation of the frequency of the non-ASPR modes is not known. An approximate representation of the non-ASPR mode can be determined with an adjustable frequency parameter. The frequency can then be determined while the system is being controlled. A frequency-locked loop (FLL) 212 is provided such that the Residual Mode Filter (RMF) can acquire and lock onto the frequency of the non-ASPR mode as shown in FIG. 2. The input to the FLL is the bandpass filtered plant output $y_{BP}$. The output of the plant is bandpass filtered so that the signal content near the modeled frequency is retained, while the remainder (especially the high frequency content) is discarded.

Figure 3:
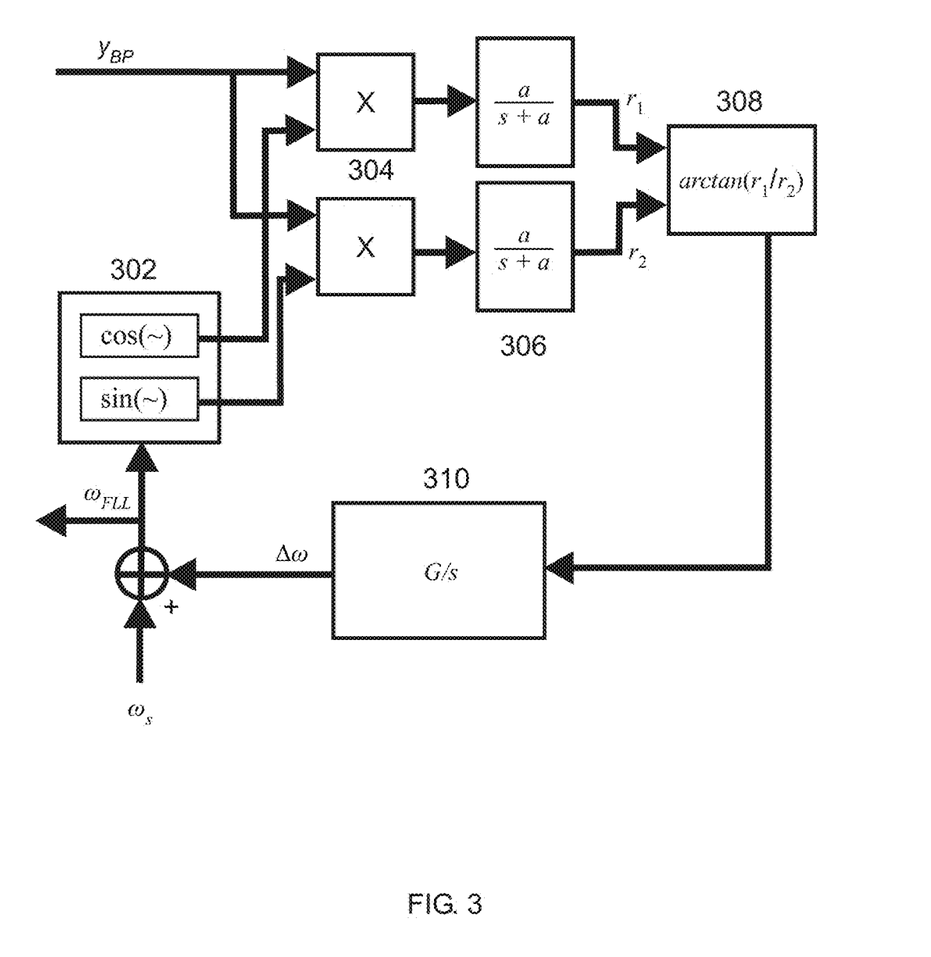
FIG. 3 shows a flow chart of a frequency lock loop suitable for use with the adaptive control system of FIG. 2.

A schematic diagram of the FLL is shown in FIG. 3. The first part of the FFL is the frequency detector. It uses a well established method for generating sinusoidal comparison signals (often referred to as the Synchronized Oscillator 302) at the current FLL frequency estimate, $\omega_{FLL}$. The initial frequency estimate is the modeled frequency $\omega_s$. Next, the input signal $y_{BP}$ is multiplied (304) by the generated sine and cosine signals. The results are passed through low pass filters 306 to derive two remainder terms, $r_1$ and $r_2$. The inverse tangent 308 of the quotient of the two remainder terms yields a signal that is proportional to the frequency error. This signal then goes to the loop filter 310 where it is multiplied by a loop gain, $G(s)/s$, then summed with the initial frequency estimate to obtain an updated frequency estimate $\omega_{FLL}$, which is the output of the FLL. This output is also used for the next cycle of the FLL in the Synchronized Oscillator 302 and to update the bandpass filter used to filter the plant output. The frequency estimate $\omega_{FLL}$ is used to update the frequency of the non-ASPR mode modeled in the RMF 210. An FLL can also be used for a disturbance estimator that has basis functions at varying frequencies. The residual mode filter (RMF), provided here as part of an adaptive control law, is applied to at least one non-ASPR mode so that this mode asymptotically approaches a zero value as time increases. Use of an FLL, without more, may not provide the synchronization of frequency and phase required to achieve the desired asymptotic behavior. It is preferable here to use a combination of an FLL and a PLL to analyze a signal associated with the RMF, including identification of, or locking onto, at least one frequency and at least one phase manifested by the RMF.

Advantages and Applications

Embodiments of the present invention provide methods for control synthesis that are relatively simple, allowing for easier implementation and verification. The algorithms can handle nonlinear systems with unmodeled dynamics, and are robust to uncertain operating environments. The methods provide disturbance accommodation that can accurately reject disturbances of known waveform, but unknown amplitude. Methods for synthesizing a bank of residual mode filters are provided that can exactly remove the component of a plant output that causes the system to become minimum phase, or put energy into resonant modes that would become excited, leading to system instability.

This technology has many potential applications. Any system having compliance and nonlinearities could benefit. In particular, the control of systems with compliant components or flexible structures is ideally suited to the approach described here. With the use of a residual mode filter, it is possible to track a model with fewer dimensions than the actual plant. Other adaptive control methods generally require the plant and tracking model to have the same dimension. RMFs can be designed independently from the controller. For example, it is possible to modify and add a bank of RMFs without any controller redesign. Conversely, it is also possible to modify a base controller while retaining the function of a tested RMF.

Control systems for wind turbines are useful applications of adaptive controllers with RMFs. The main nonlinearities in a wind turbine model come from the nonlinear aerodynamic loads on the turbine. Creating an accurate model of the dynamic characteristics of a wind turbine is expensive and extremely difficult, if not impossible. Additionally, wind turbines operate in highly turbulent and unpredictable conditions. These complex aspects of wind turbines make them attractive candidates for the application of adaptive control methods. It has been demonstrated that the uniform wind disturbance, without shear, across the rotor disk of a turbine can be accurately accounted for when modeled as a step disturbance of unknown amplitude. Rejection of step disturbances can be implemented in the controller to improve performance and to reduce destructive loads.

The auto industry can use the algorithms in many of their component systems and in the drive system. Other applications include heavy machinery, precise systems, such as surgical or video tracking systems, control of large cranes such as those used to load and unload container ships, control of support structures for space vehicle solar panel arrays, and even financial modeling and control. Yet other applications include automated assembly lines for manufacturing, automated handling and distribution (e.g., on-line retailer with automated order filling and shipping system), as well as other robotic applications.

EXAMPLES

Example 1: Low-Wind-Speed Operation of a Three-Bladed Horizontal-Axis Wind Turbine The adaptive control with Residual Mode Filter was implemented for a 5 MW offshore wind turbine model. The wind turbine had a rotor radius of 63 m and 5 MW of rated power. The cut-in, rated and cut-out wind speeds were 3 m/s, 11.4 m/s and 25 m/s respectively. Cut-in and rated rotor speeds are 6.9 m/s and 12.1 m/s respectively. Rated tip speed was 80 m/s with a tip speed ratio (ratio of blade tip speed to wind speed) of 7.55.

The model included eleven switches for various degrees of freedom which could be switched on and off to add complexity. When all degrees of freedom were switched on, the model had 31 states. To design the wind speed and partial state estimation of the wind turbine, the turbine was linearized at a constant wind speed of 8 m/s with blade pitch held at 0°. During the linearization, the drive train and generator degrees of freedom switches were turned on giving four states with two states due to the generator and two states due to the drive train. The first generator state (generator azimuth position) was removed to get a three state model of the wind turbine. This three state model was then augmented with a wind disturbance model (the disturbance generator) given by Eqn. (2). The adaptive gain controller (with Disturbance Estimator) of Eqn. (34) and (35) was implemented with $G_D=15{,}000$ and $G_e=0.0001$.

Figure 4:
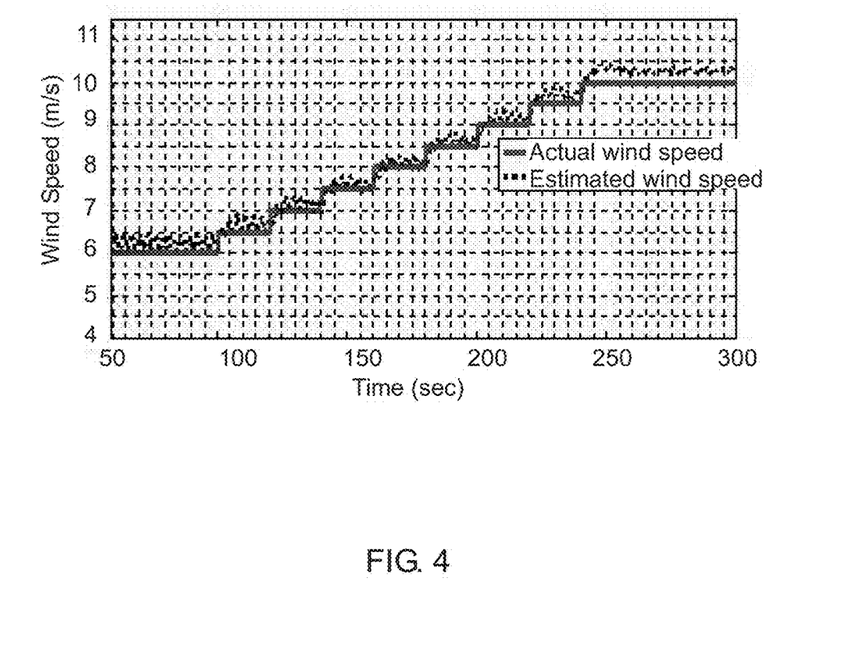
FIG. 4 shows the actual and estimated wind speed for a series of step changes in wind speeds between the cut-in and rated wind speeds for an adaptive control system for a three-bladed horizontal axis wind turbine.

FIG. 4 shows the actual and estimated wind speed for a series of step changes in wind speeds between the cut-in and rated wind speeds (i.e., operational wind speeds below the rated speed, an operation regime generally referred to as "Region II.") The Disturbance Estimator is seen to estimate the wind speed with good accuracy.

Maximum power output in Region II is achieved for a constant tip speed ratio.

Figure 5:
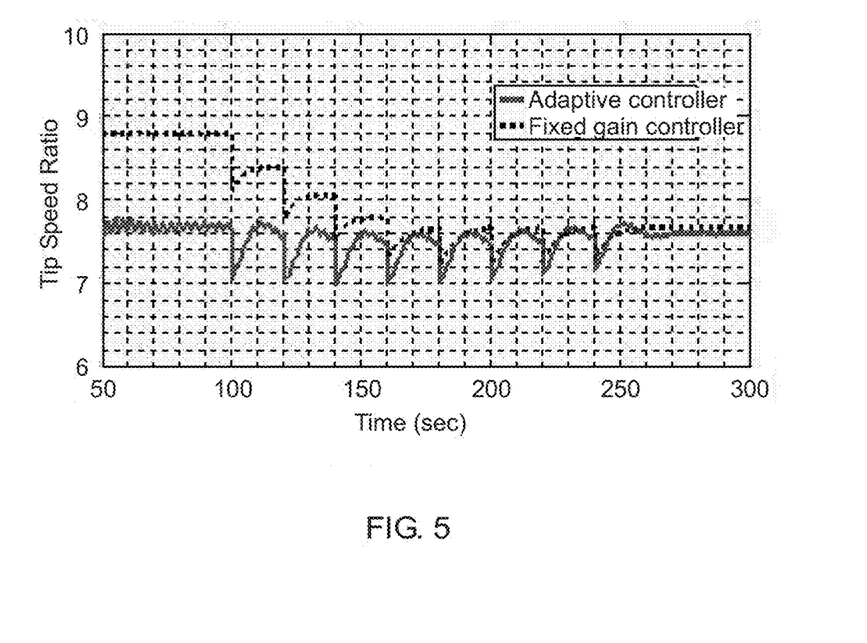
FIG. 5 shows the response of the controlled tip speed ratio to the same series of step changes in wind speed shown in FIG. 4.

FIG. 5 shows the response of the controlled tip speed ratio to the same series of step changes in wind speed shown in FIG. 4. Results are shown for a conventional fixed-gain controller and for the adaptive controller. As can be seen in FIG. 5, the adaptive controller was significantly more effective at adapting to the wind speed than the fixed-gain controller.

Figure 6:
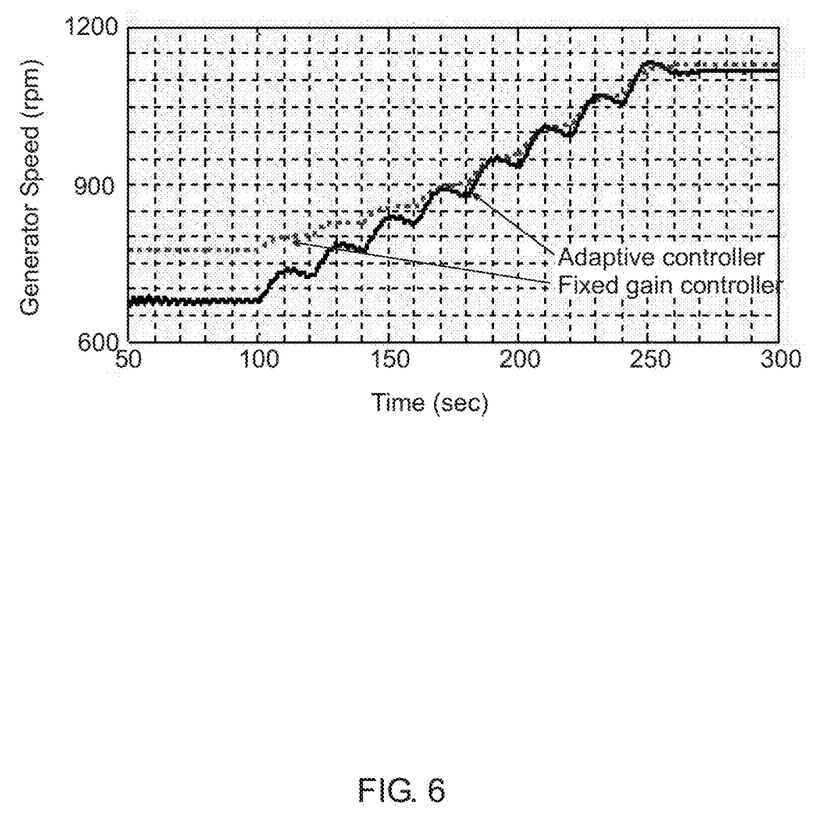
FIG. 6 shows the generator rotational speed for the adaptive gain controller and for a fixed-gain controller for the same series of step changes in wind speed shown in FIG. 4.

The generator rotational speed is shown in FIG. 6 for the adaptive controller and for a fixed-gain controller for the same series of step changes in wind speed shown in FIG. 4. At the lower wind speeds, there is behavior difference between the two controllers, because in the fixed-gain controller, the generator torque $\tau$ is directly a function of generator speed ($\tau=K\omega^2$, where K is some constant depending on the desired tip speed ratio, and $\omega$ is the generator rotational speed). But in the adaptive disturbance-tracking control, there is no direct relation between the generator rotational speed and torque; instead, the generator torque is adjusted so that the generator rotational speed is proportional to the wind speed.

Example 2: Robotic Surgical Systems

Robotic surgical systems are used to operate on a patient's body, and can provide very fine control over movements or access that would be difficult or impossible to practice by hand. However, as the patient is alive during the surgery, the body is generating rhythmic movements due to breathing or heart beat that can generate disturbances that could propagate to the surgical system. By utilizing the control systems and methods described herein, the surgical system can be made safer and more reliable.

Example 3: Vehicle Control Systems

There are a variety of control systems implemented in cars, trucks, trains, and the like to control speed, braking, suspension, steering, and other operating features. There are also various sources of persistent or periodic disturbances such as tire irregularities, road surface structure (e.g., regularly spaced seams in concrete road surface or bridge roadways), engine vibrations, and the like that can prevent a simple controller from functioning adequately. Improved control system performance can be achieved by using the adaptive disturbance accommodating controllers described herein to filter out the disturbances.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A physical system having an adaptive controller system for controlling the physical system, the physical system further comprising sensors and actuators;
    the physical system being nonlinear with unmodeled dynamics, and
    the adaptive controller system being configured
        to receive one or more output from the physical system, including indications of one or more nonlinear disturbances to the physical system,
        to analyze the output, and
        to cancel the one or more nonlinear disturbances without needing knowledge of their amplitude,
    wherein the physical system is modeled as a linear, finite dimensional system having at least one mode which is not Almost Strictly Positive Real (ASPR), wherein said at least one not ASPR mode includes one or modes associated with:
    a wind turbine train,
    a blade flap, or
    periodic interactions between turbine blades and the wind turbine drive train; and
    the model of the physical system further comprises:
        a state vector, a control input vector and a plant output vector;
        a disturbance vector comprising disturbances having known basis functions and unknown amplitudes and not dependent upon parameters that define the plant system, wherein the disturbance vector affects said at least one mode which is not ASPR;
        a disturbance estimator, associated with the disturbance vector, for estimating at least one of a present value and a future value of the disturbance vector; and
    wherein the adaptive controller system being configured to analyze the output and to cancel the one or more nonlinear disturbances includes configuring the adaptive controller system to execute an adaptive control law comprising:

(i) a first adaptive gain for an error vector associated with the plant output vector;
(ii) a second adaptive gain for the disturbance vector; and
(iii) a fixed gain for the disturbance estimator,
wherein the adaptive control law adjusts the control input vector, to cause the error vector to asymptotically approach a 0 value as time increases;
(iv) a residual mode filter that causes an amplitude associated with the at least one mode that is not Almost Strictly Positive Real to asymptotically approach a zero value as time increases;
(v) a first frequency-locked loop, operable to lock a first filter output to at least one frequency manifested by the disturbance vector;
and (vi) a second frequency-locked loop and phase-locked loop, operable to lock a second filter output onto at least one frequency and at least one phase manifested by the residual mode filter.

2. The physical system of claim 1, wherein said error vector comprises deviations of said output plant vector from a vector of set points.

3. The physical system of claim 1, wherein said error vector comprises deviations from a desired model behavior.

4. The physical system of claim 1, wherein said physical system comprises a wind turbine having at least one turbine blade.

* * * * *